United States Patent [19]

Lehanneur

[11] Patent Number: 5,284,383
[45] Date of Patent: Feb. 8, 1994

[54] ADJUSTING AND LOCKING DEVICE FOR MOUNTING A CYCLE WHEEL HUB

[76] Inventor: Claude Lehanneur, 8, rue Camille Saulnier, 78110 Le Vesinet, France

[21] Appl. No.: 839,768
[22] PCT Filed: Oct. 12, 1990
[86] PCT No.: PCT/FR90/00732
  § 371 Date: Apr. 10, 1992
  § 102(e) Date: Apr. 10, 1992
[87] PCT Pub. No.: WO91/05694
  PCT Pub. Date: May 2, 1991

[30] Foreign Application Priority Data

Oct. 13, 1989 [FR] France .................. 89 13401

[51] Int. Cl.5 ............................................. B60B 27/06
[52] U.S. Cl. ............................ 301/110.5; 301/124.2
[58] Field of Search .................. 301/105.1, 110.5, 111, 301/114, 124.2; 280/279, 288

[56] References Cited

U.S. PATENT DOCUMENTS

| 3,220,784 | 11/1965 | Kilmer | 301/110.5 X |
| 3,922,018 | 11/1975 | Shook | 301/110.5 |
| 4,424,981 | 1/1984 | Maxwell III | 301/110.5 X |

FOREIGN PATENT DOCUMENTS

| 471942 | 11/1914 | France . | |
| 1216709 | 4/1969 | France . | |
| 424141 | 6/1948 | Italy | 301/110.5 |
| 463919 | 2/1952 | Italy | 301/124.2 |
| 320276 | 10/1929 | United Kingdom | 301/110.5 |

*Primary Examiner*—Russell D. Stormer
*Attorney, Agent, or Firm*—Sughrue, Mion, Zinn, Macpeak & Seas

[57] ABSTRACT

An adjusting and locking device for mounting a cycle wheel hub of the type having a tubular body supported in a rotating manner on an internal hollow traversing shaft by the intermediary of two rolling bearings, each being positioned at one end part of the body and having a clearance that is adjustable by a clearance adjusting nut which abuts the bearings and which is axially screwed on the shaft. A locking pressure tubular screw is axially screwed into the clearance adjusting nut and abuts on the end of the internal traversing shaft.

3 Claims, 1 Drawing Sheet

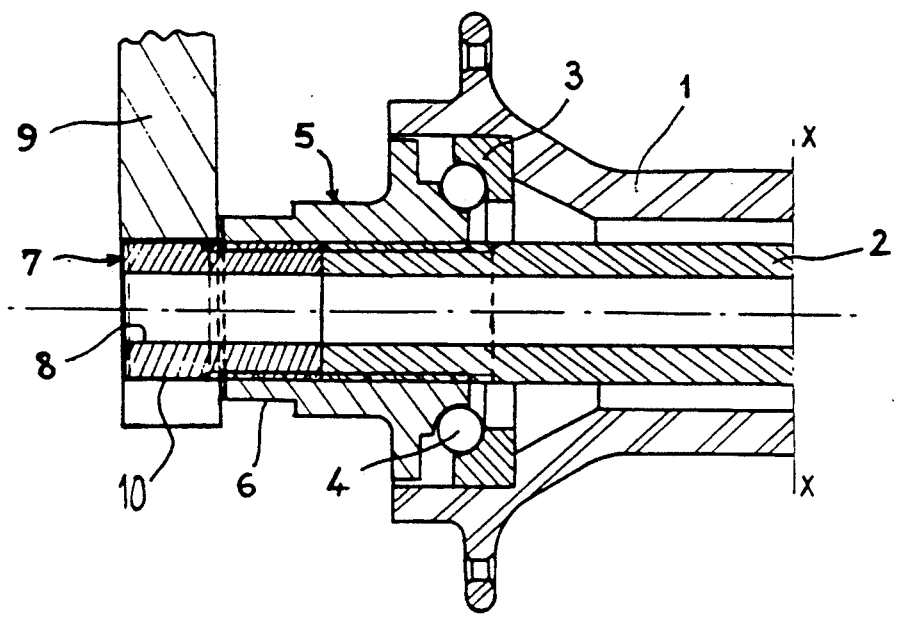
Fig: 1
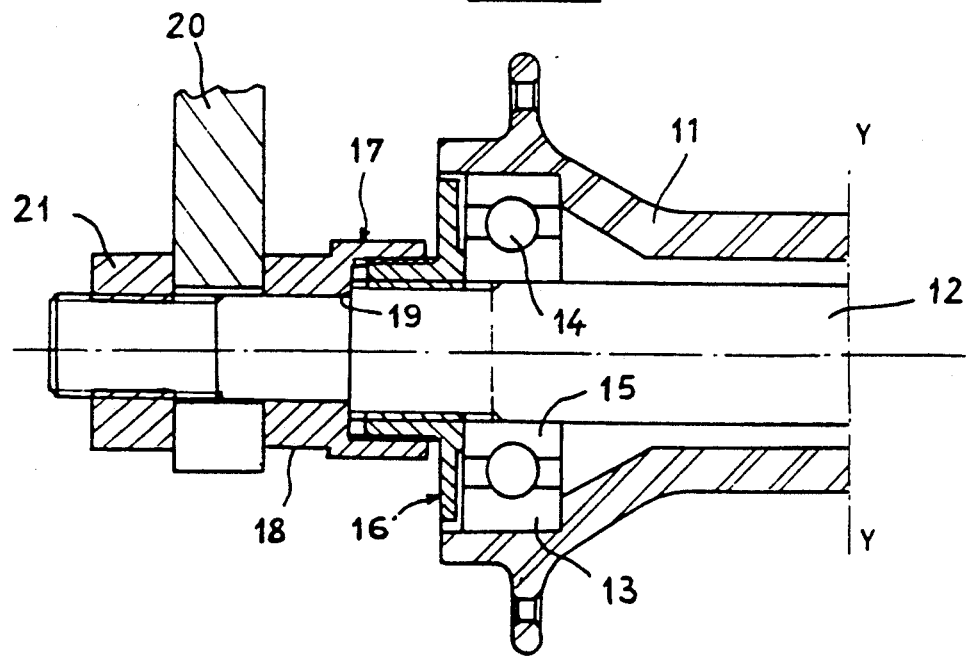
Fig: 2

ADJUSTING AND LOCKING DEVICE FOR MOUNTING A CYCLE WHEEL HUB

BACKGROUND OF THE INVENTION

The present invention relates to the cycle industry. It relates to a bicycle wheel hub with adjustable bearing play, and more particularly to an adjusting and locking device for the mounting of such a hub.

A bicycle wheel hub normally comprises a tubular body supported in rotation by the intermediary of two ball bearings on an internal traversing shaft which is at least partially threaded.

Furthermore and often, the tubular body forms a cross-piece between the outer bearing rings and the clearance of the bearings can be adjusted by means of a slight axial displacement of at least one of the inner bearing rings which are screwed or which are made to slide on the traversing shaft towards the mean plane of the wheel.

After adjusting the clearance, the inner ring which has been displaced must be immobilized and this immobilization is frequently obtained by means of a nut/lock-nut system where the nut and the lock-nut are both screwed on the shaft and locked against each other. Now this method has disadvantages which will be explained below. In this explanation, a distinction will be made between the inner and outer sides of the thread of the shaft which are respectively oriented towards the mean plane of the wheel and towards the outside of the wheel. During the adjustment, the nut which pushes the balls towards the inside of the hub bears on the inner sides of the thread of the shaft; on the contrary, after locking, the nut which is itself pushed towards the inside by the lock-nut, locks onto the outer sides of the thread of the shaft.

Between the adjustment phase and the locked phase, the nut has therefore changed bearing sides; now, the axial play of the nut on the shaft is not zero and the change of bearing sides implies an axial displacement of the nut towards the inside of the hub. This displacement modifies the initial adjustment and risks causing an excessive tightening of the balls which, as is well understood, would be harmful to the smoothness of rolling and to the service life of the mechanical elements. In practice, in order to avoid such excessive tightening, a process of trial and error is often carried out by leaving a certain clearance during% adjustment which is intended to disappear when locking the nut/lock-nut system. Adjustment by trial and error is a waste of time and, furthermore, it is not within everyone's capability and for a piece of machinery as widespread among the public as the bicycle, it can be expected that there is a high number of hubs incorrectly adjusted and having either an excessive clearance or an excessive tightening.

SUMMARY OF THE INVENTION

The purpose of the present invention is to overcome the disadvantages explained above by proposing means of carrying out the double operation of adjustment and locking of a bicycle hub without trial and error and avoiding excessive tightening of the bearing balls.

For this purpose, and according to an essential feature of the invention, the conventional lock-nut screwed on the traversing shaft, at least on one side, is replaced by a locking member abutting on the shaft and which is screwed axially onto the adjusting nut. This locking member applies a thrust on the shaft in the direction of the mean plane of the wheel, and applies a tension on the adjusting nut in the direction of the outside of the wheel. The advantage of this device is that it allows adjustment and locking without changing bearing sides. In fact, if at the end of the adjustment phase, the adjusting nut is as before bearing on the inner edges of the thread of the shaft, the tightening of the locking part which draws this nut towards the outside increases the force which the nut would already be applying on the same inner edges and locks the nut on these edges. There is therefore no change of bearing edges between the adjustment and the locking, and the device according to the invention eliminates the disadvantages of the axial clearance between the shaft and the nut; it allows the carrying out of the double operation of adjustment and locking without trial and error and eliminates the risk of excessive tightening on the balls due to this clearance.

Other features and advantages of the invention will emerge more clearly from the following description of two embodiments given by way of example with reference to appended drawings in which:

BRIEF DESCRIPTION OF THE DRAWINGS

FIG. 1 is a diagrammatic half-view in longitudinal and axial cross-section of a hub according to the invention; and FIG. 2 is a diagrammatic half-view similar to the preceding one and relating to a variant embodiment.

These FIGS. 1 and 2 show two embodiments which differ from each other essentially in the type of screw or nut of the locking member of a tolerance-adjusting nut.

DESCRIPTION OF PREFERRED EMBODIMENTS

In FIG. 1 there can be seen a tubular body 1, an internal hollow traversing shaft 2, an outer bearing ring 3, balls 4, an inner bearing ring 5 forming an adjusting nut and which is provided with flats 6, a pressure screw 7 provided with a hexagonal socket 8, a frame attachment part 9 and a mean plane X—X of the wheel. The type of fixing of the wheel of the fast locking type with a central rod has not been shown. The bearing is of the cone-cup type. It proves possible, after adjustment of the nut 5, to screw the pressure screw 7 and to lock the latter against the end of the shaft 2 by means of the flats 6 and of the socket 8. During the locking operation, the adjusting nut 5 remains bearing on the inner sides of the thread of the shaft. The locking member 7 which abuts on the traversing shaft 2 is here of the locking screw type.

It is a matter of a pressure screw abutting on the end of the shaft and screwed inside the adjusting nut forming a connecting sleeve between the shaft and the screw.

The shaft and the screw have two threads of the same diameter and of the same pitch and the adjusting nut has a single internal screw thread which is long enough to receive the threaded ends of the shaft and the screw.

Towards the outside of the wheel, the pressure screw has a short and hollow cylindrical tail shaft 10 intended to allow the fixing of the wheel on the frame by means of a conventional fast locking with a central rod. This tail shaft could have been sufficiently long and externally threaded for a fixing of the wheel on the frame by means of a retaining nut. At right angles to the frame attachment part, this tail shaft could have had parallel pairs of flats intended to allow the tightening of the screw and, after mounting the wheel on the frame, preventing any untightening of that screw. The screw shown which is not provided with such flats is provided with a hexagonal socket intended to facilitate the locking of the screw.

For the variant embodiment shown in FIG. 2, the locking member is, on the contrary, of the lock-nut type. There can be seen a hollow body 11, a solid shaft 12, an outer bearing ring 13, balls 14, an inner bearing ring 15, an adjusting nut 16, a lock-nut 17 provided with external flats 18, a shoulder 19 of the solid shaft 12, a frame attachment part 20, a nut 21 for fixing the wheel, and a mean plane Y—Y of the wheel. After adjusting the nut 16, it is possible to screw the nut 17 and lock this nut against the collar 19, by means of the flats 18 and of similar flats which are not shown on the figure and which are located at the other end of the hub. During the locking operation, the adjusting nut 16 remains bearing on the inner sides of the thread of the shaft.

The shaft 12 which traverses the lock-nut 17 has a threaded end intended to receive the retaining nut 21 for fixing the wheel on the frame.

This shaft could have been hollow and have, inside the lock-nut 17, a shorter end adapted to a fixing of the wheel on the frame by means of a conventional fast locking system.

Instead of being traversed by the shaft 12, the lock-nut 17 could have completely covered the shaft, at right angles to the collar 19, and itself have a tail shaft 10 for fixing the wheel on the frame, either long and threaded for fixing with a retaining nut, or short and hollow for fixing by fast locking. In both cases, the lock-nut which forms a stop piece with respect to axial forces is a suspended nut coaxial with the shaft and with the adjusting nut.

I claim:

1. In an adjusting and locking device for mounting a cycle wheel hub of the type comprising a tubular body (1) supported in a rotating manner on an internal traversing shaft (2) by the intermediary of two rolling bearings, and a clearance adjusting nut (5) abutting the bearings and axially screwed on the shaft (2), each bearing being positioned at one end part of the body and having a clearance which is adjustable by said clearance adjusting nut (5), the improvement which comprises a locking pressure tubular screw (7) axially screwed into the clearance adjusting nut (5) and abutting an end of the internal traversing shaft (2).

2. The device according to claim 1, wherein the pressure tubular screw (7) is provided with a hexagonal socket head.

3. The device according to claim 1, wherein the pressure tubular screw (7) protrudes to the outside of the adjusting nut (5) in the form of a cylindrical tail shaft (10).

* * * * *